US009594967B2

(12) United States Patent
Chuang et al.

(10) Patent No.: US 9,594,967 B2
(45) Date of Patent: Mar. 14, 2017

(54) METHOD AND APPARATUS FOR IDENTIFYING A PERSON BY MEASURING BODY PART DISTANCES OF THE PERSON

(71) Applicant: Google Inc., Mountain View, CA (US)

(72) Inventors: Chen-Ting Chuang, Pingtung County (TW); Choon Ping Chng, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/675,142

(22) Filed: Mar. 31, 2015

(65) Prior Publication Data

US 2016/0292523 A1 Oct. 6, 2016

(51) Int. Cl.

| | |
|---|---|
| ***G06K 9/00*** | (2006.01) |
| ***G06K 9/62*** | (2006.01) |
| ***G06T 1/00*** | (2006.01) |
| ***G06T 7/00*** | (2006.01) |
| ***H04N 13/02*** | (2006.01) |
| *H04N 101/00* | (2006.01) |

(52) U.S. Cl.

CPC ..... *G06K 9/00885* (2013.01); *G06K 9/00362* (2013.01); *G06K 9/6202* (2013.01); *G06K 9/6215* (2013.01); *G06T 1/0007* (2013.01); *G06T 7/0044* (2013.01); *G06T 7/0061* (2013.01); *H04N 13/0271* (2013.01); *G06K 2207/1012* (2013.01); *G06K 2209/21* (2013.01); *G06K 2209/40* (2013.01); *G06T 2200/04* (2013.01); *G06T 2200/21* (2013.01); *G06T 2207/10028* (2013.01); *G06T 2215/16* (2013.01); *H04N 2101/00* (2013.01); *H04N 2213/005* (2013.01)

(58) Field of Classification Search

USPC ........................................ 382/103, 106, 154

See application file for complete search history.

(56) References Cited

U.S. PATENT DOCUMENTS

2004/0062427 A1* 4/2004 Biswas ............. G06K 9/00006 382/125
2006/0126941 A1* 6/2006 Higaki .............. G06K 9/00201 382/190
2009/0215533 A1 8/2009 Zalewski et al.
(Continued)

FOREIGN PATENT DOCUMENTS

JP 08-178390 A 7/1996
JP 2014-186523 A 10/2014
(Continued)

OTHER PUBLICATIONS

PCT/US2016/014323—International Search Report and Written Opinion, issued May 13, 2016, 11 pages.

*Primary Examiner* — Alex Liew
(74) *Attorney, Agent, or Firm* — Blakely Sokoloff Taylor Zafman LLP

(57) ABSTRACT

A method is described that includes capturing a pixelated depth image of a person with a depth camera. The method also includes identifying body parts from the image. The method also includes forming a vector of distances between the body parts. The method also includes comparing the vector against a database of respective body distance vectors for a plurality of people to identify the person.

23 Claims, 11 Drawing Sheets

Depth Camera 101

Capture pixelated depth image of person with depth camera 201

Identify body parts from image 202

Form vector of distances between body parts 203 compare vector against dB of respective critical body distance vectors for a plurality of people to identify the person in the image 204 y z x

(56) References Cited

U.S. PATENT DOCUMENTS

| | | | | |
|---|---|---|---|---|
| 2010/0034457 | A1* | 2/2010 | Berliner | G06K 9/00362 382/154 |
| 2012/0257797 | A1 | 10/2012 | Leyvand et al. | |
| 2013/0009865 | A1 | 1/2013 | Valik et al. | |
| 2014/0045593 | A1 | 2/2014 | Giusti et al. | |
| 2014/0147037 | A1 | 5/2014 | Choi et al. | |
| 2014/0198954 | A1* | 7/2014 | Bulzacki | G06K 9/00342 382/103 |

FOREIGN PATENT DOCUMENTS

| | | |
|---|---|---|
| KR | 10-0824757 B1 | 4/2008 |
| KR | 10-1499698 B1 | 3/2015 |
| WO | WO-2013066601 | 5/2013 |

* cited by examiner

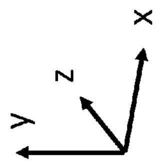
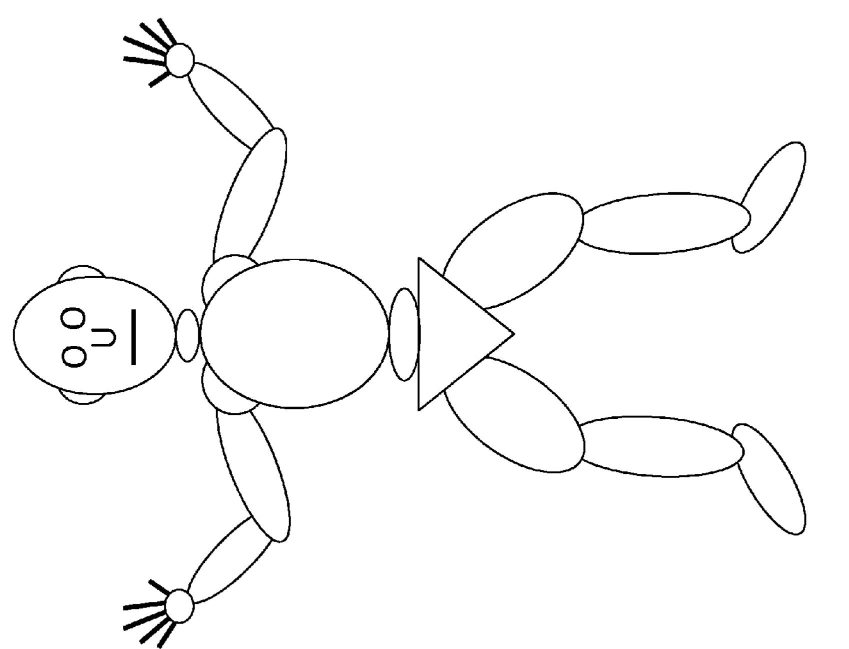
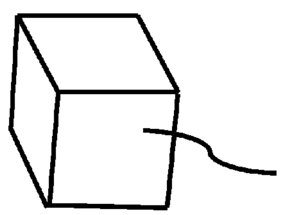
Depth Camera 101
Fig. 1

| Line Segments(s) | Representative Distance |
|---|---|
| AB | Distance between shoulders |
| AN | Length of right upper arm |
| AC | Distance from right shoulder to right mid-section |
| AD | Distance from right shoulder to left mid-section |
| AE | Distance from right shoulder to right hip |
| AF | Distance from right shoulder to left hip |
| BM | Length of left upper arm |
| NP | Length of right lower arm |
| MO | Length of right lower arm |
| CD | Length of mid-section |
| EG | Length of right upper leg |
| FH | Length of left upper leg |
| GI | Length of right lower leg |
| HJ | Length of left lower leg |
| IL | Length of right foot |
| JK | Length of left foot |

Fig. 4

METHOD AND APPARATUS FOR IDENTIFYING A PERSON BY MEASURING BODY PART DISTANCES OF THE PERSON

FIELD OF INVENTION

The field of invention pertains generally to image processing and more specifically to a method and apparatus for identifying a person by measuring body part distances of the person.

BACKGROUND

Many existing computing systems include a traditional camera as an integrated peripheral device. A current trend is to enhance computing system imaging capability by integrating depth capturing into its imaging components. Depth capturing may be used, for example, to perform various intelligent object recognition functions such as facial recognition (e.g., for secure system un-lock) or hand gesture recognition (e.g., for touchless user interface functions).

One depth information capturing approach, referred to as "time-of-flight" imaging, emits (e.g., infra-red (IR)) light from a system onto an object and measures, for each of multiple pixels of an image sensor, the time between the emission of the light and the reception of its reflected image upon the sensor. The image produced by the time of flight pixels corresponds to a three-dimensional profile of the object as characterized by a unique depth measurement (z) at each of the different (x,y) pixel locations. Other types of depth capturing approaches include stereo triangulation, sheet of light triangulation and structured light.

Depending on implementation, some depth capturing cameras may be able to also take traditional 2D images within the field of view of the camera. For example, a time-of-flight camera may also include visible light color pixels (e.g., Bayer patterned red (R), blue (B) and green (G) pixels) integrated on a same image sensor with pixels that detect the light used for the time-of-flight measurement).

FIGURES

The following description and accompanying drawings are used to illustrate embodiments of the invention. In the drawings:

FIG. 1 shows a person's image being captured by a depth camera;

FIG. 4 shows an exemplary profile of a person's body part distances;

Figure 2:
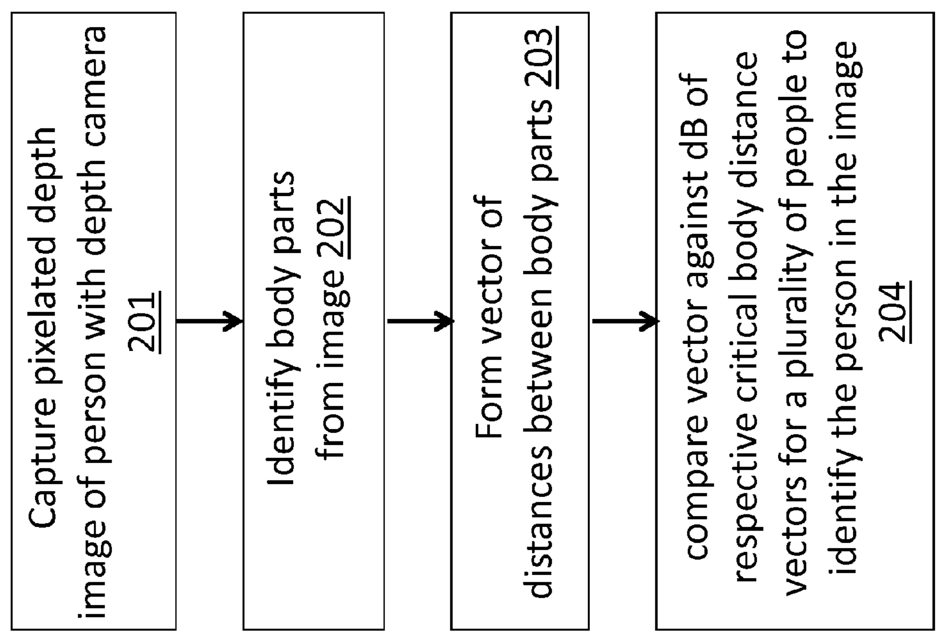
FIG. 2 shows a method for identifying a person with a depth camera.
Figure 7:
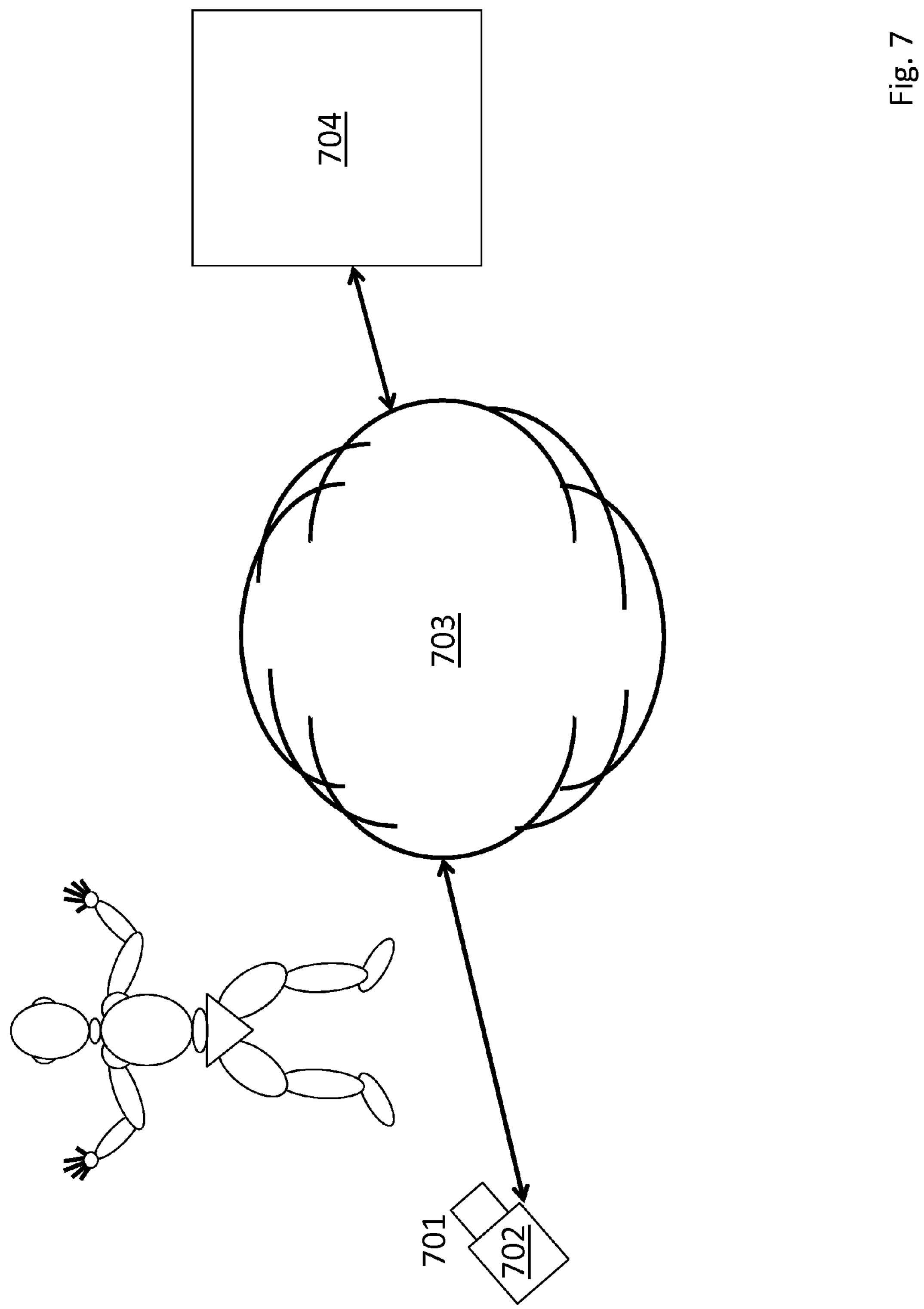
Figure 8:
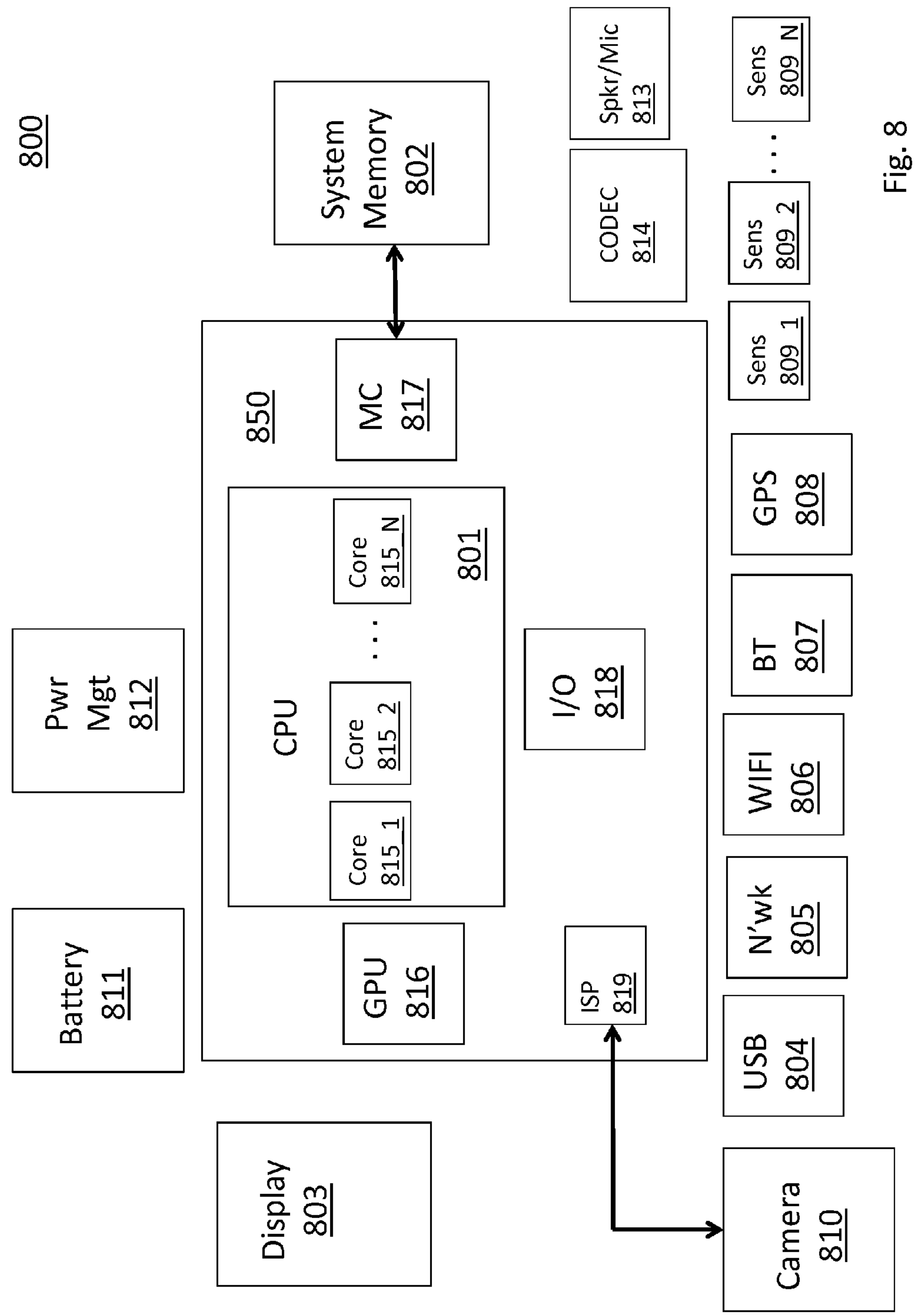

FIGS. 6*a* through 6*d* demonstrate an example of determining a distance between two body parts;

FIG. 7 shows an environment in which the methodology of FIG. 2 may be practiced;

FIG. 8 shows an embodiment of a computing system.

DESCRIPTION

FIGS. 1 and 2 pertain to an approach for identifying a person (explicitly or implicitly) with a depth camera. As observed in FIG. 1 a person is within the field of view of a depth camera 101. FIG. 2 shows a process that uses the depth camera to identify the person based on measurements of certain distances of the person's body structure.

As observed in FIG. 2, the process includes capturing a pixelated depth image of a person 201. The image is then analyzed 202 to identify critical parts of the person's body (e.g., shoulders, elbows, wrists, knees, ankles, etc.). A vector of critical body part distances is then formulated 203 which essentially describes the person in terms of numerous specific distances between the various critical body parts of the person. The vector of critical body part distances is then compared 204 against a database that includes numerous such vectors that are each respectively linked to a different person (explicitly or implicitly). A match between the formulated vector and a vector found in the database results in the person being identified.

Figure 3:
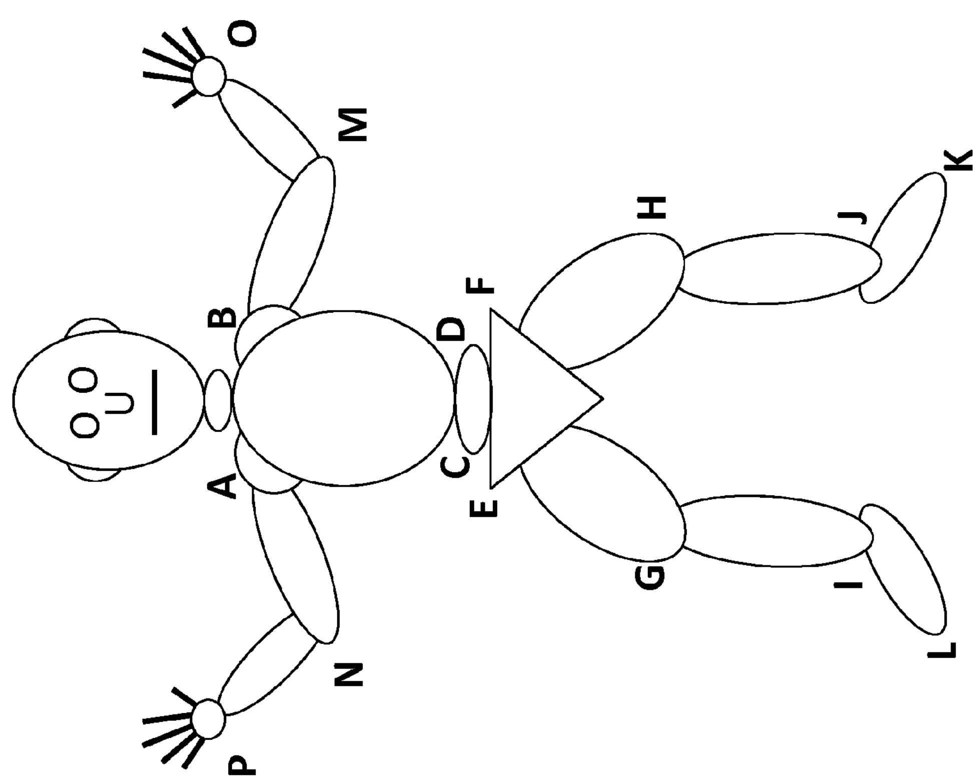
FIG. 3 shows various parts of a person's body.

FIG. 3 shows an exemplary depiction of a person with various potential critical body parts being identified with a different letter. Although not indicated in FIG. 3, additional letters could be added on various features of the person's face (e.g., left ear, right ear, left eye, right eye, nose, chin, etc.). Here, the analyzing of the image of the person results in specific points in the image being identified as a critical body part (e.g., a first specific point in the image is identified as being the person's right wrist P, a second specific point in the image is identified as being the person's right elbow N, etc.). As will described in more detail further below, distances between these points are calculated to effectively build a vector that can be used as a profile or characteristic description of the person based on these distances.

FIG. 4 shows some of the distances that can be calculated from the A through P critical body parts of FIG. 3. All together there are sixteen different distances illustrated in FIG. 4. Other vector embodiments may have considerably more or less and/or different entries than the sixteen shown in FIG. 4.

Figure 5:
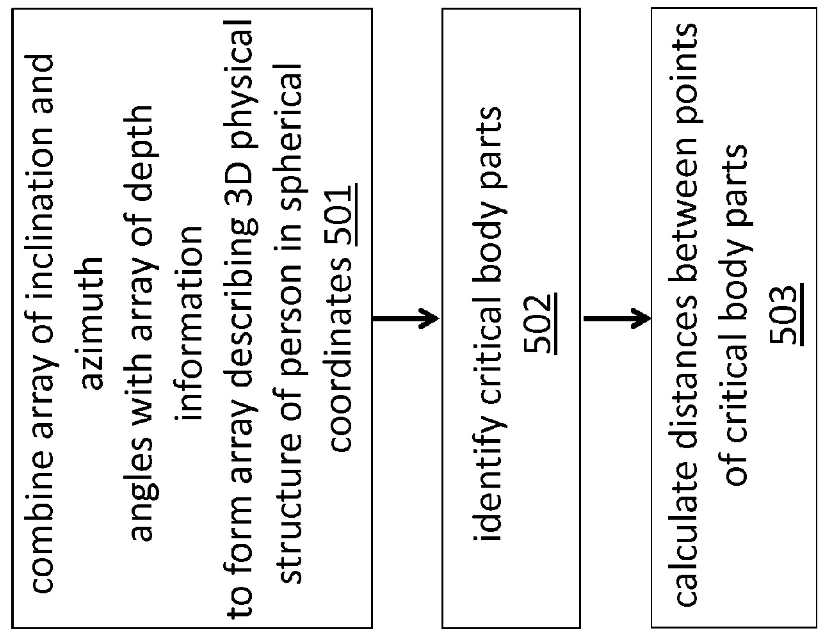
FIG. 5 shows a method for constructing a profile vector of body part distances.

FIG. 5 shows a more detailed process flow that can be used to implement the process flow of FIG. 2. As observed in FIG. 5, a three dimensional physical structure of the person in spherical coordinates is crafted by forming an array of inclination angles, azimuth angles and depth values from the image camera 501. The three dimensional image of the person's physical structure is then analyzed to determine the location of the person's critical body parts 502. Distances between the points are then calculated 503 (e.g., using the spherical coordinate points identifying the critical body parts). In alternate embodiments, the definition of the points in space where the critical body parts reside may be expressed in other coordinate systems such as Cartesian or Cylindrical (e.g., that may be determined outright or translated from an original array expressed in spherical coordinates). For simplicity the remainder of the present specification will refer primarily to the use of spherical coordinates (as the translation between any two coordinate systems is a straightforward operation for those of ordinary skill).

Regardless of which coordinate system is used, a salient feature of the present approach is the identification of the body part locations in 3 dimensional space rather than 2 dimensional space.

Figure 6A:
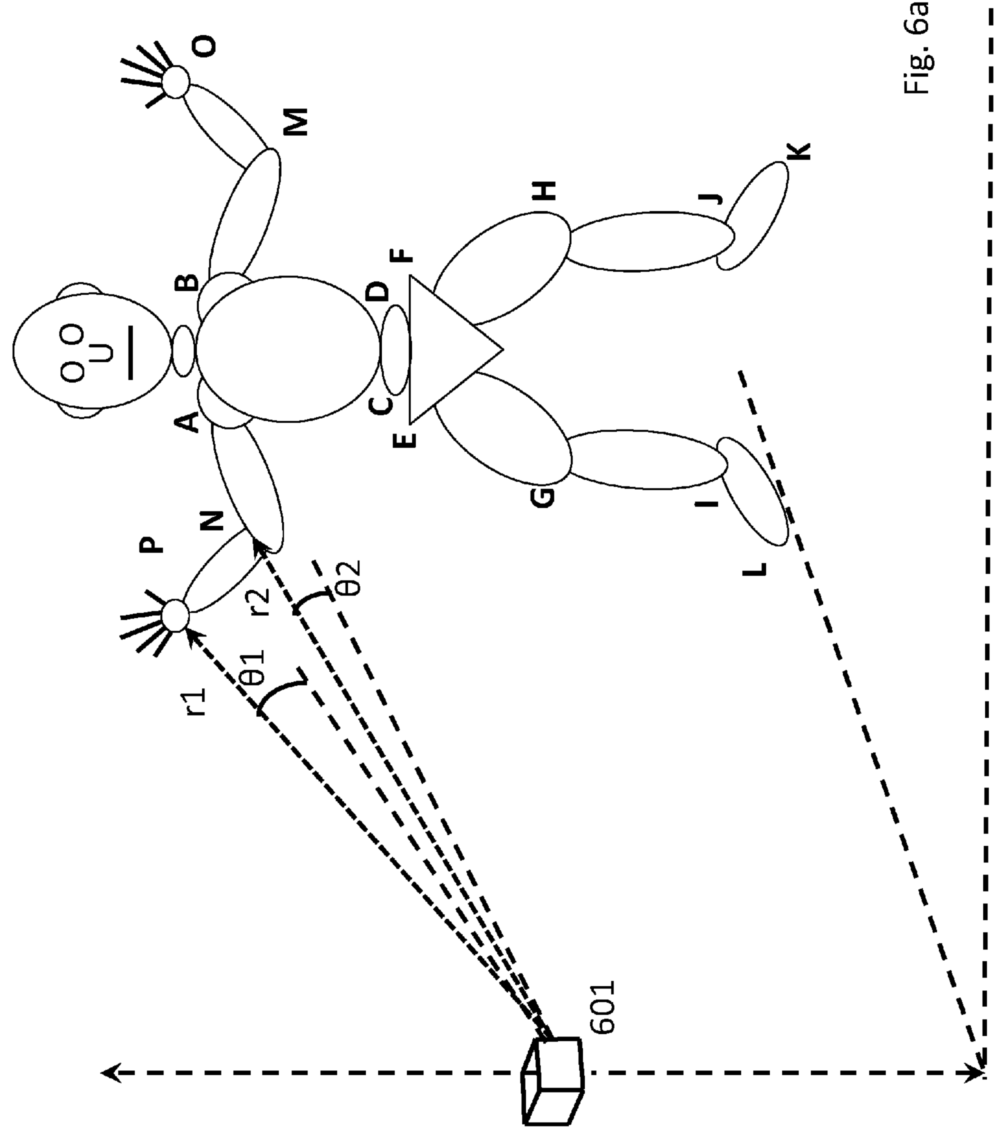
Figure 6B:
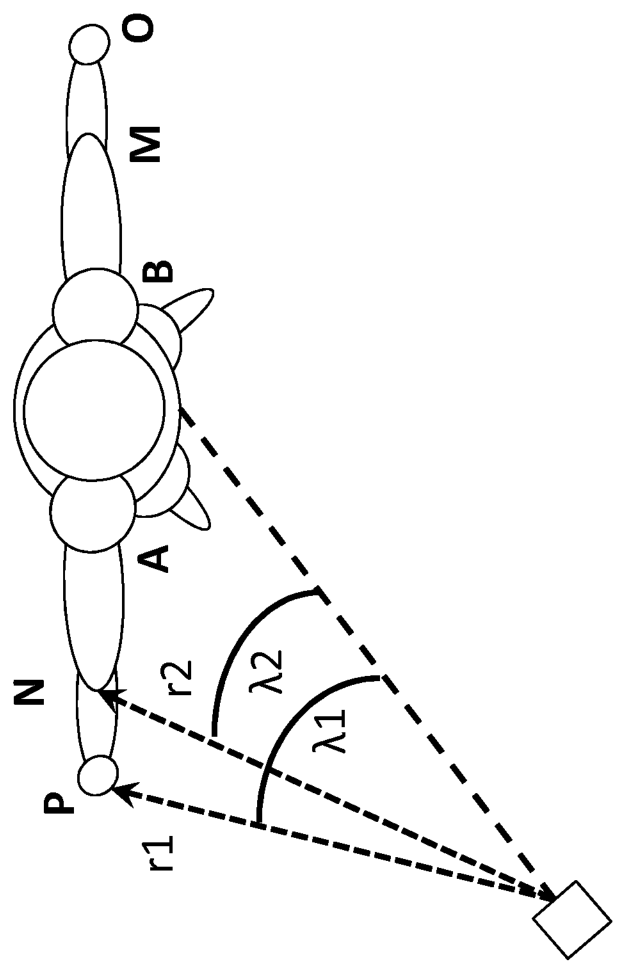
Figure 6C:
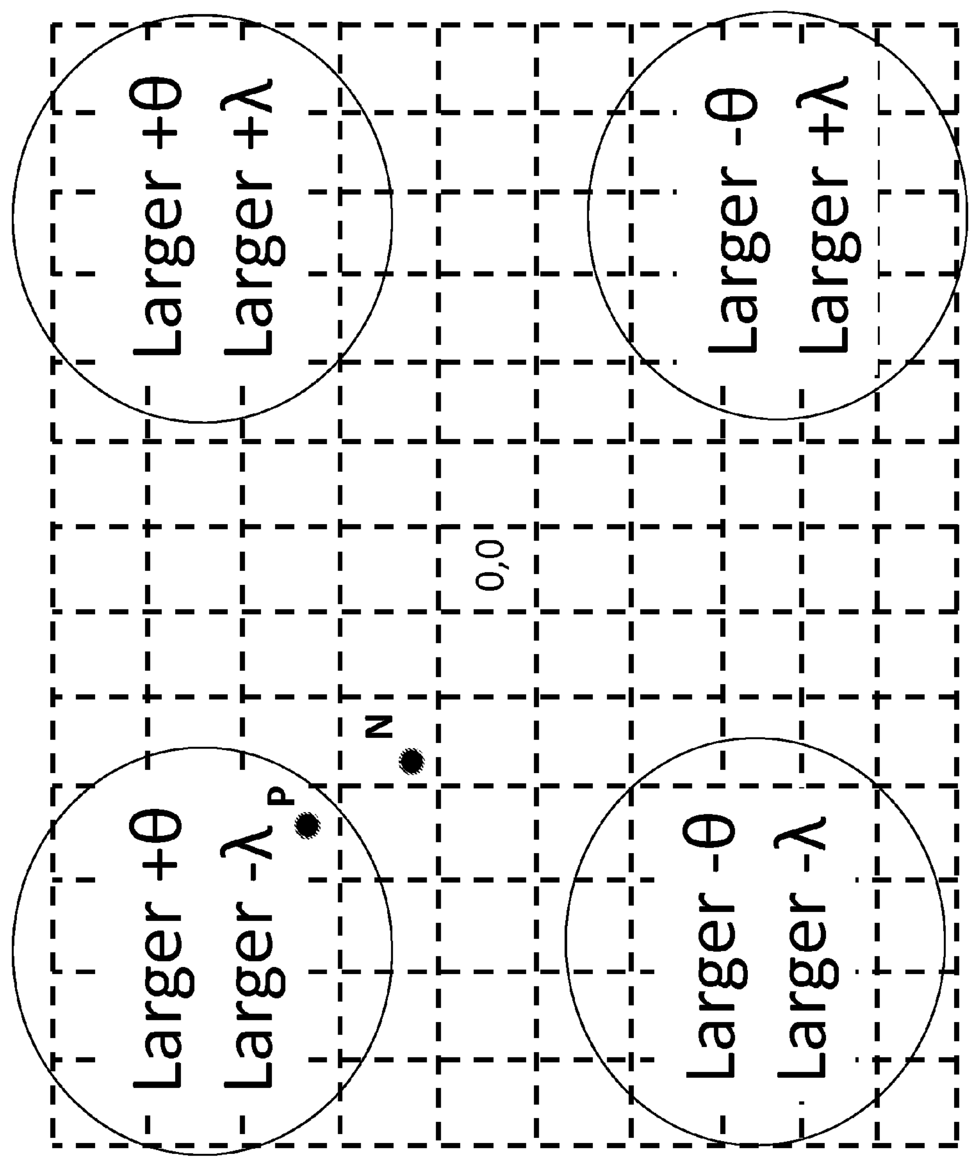
Figure 6D:
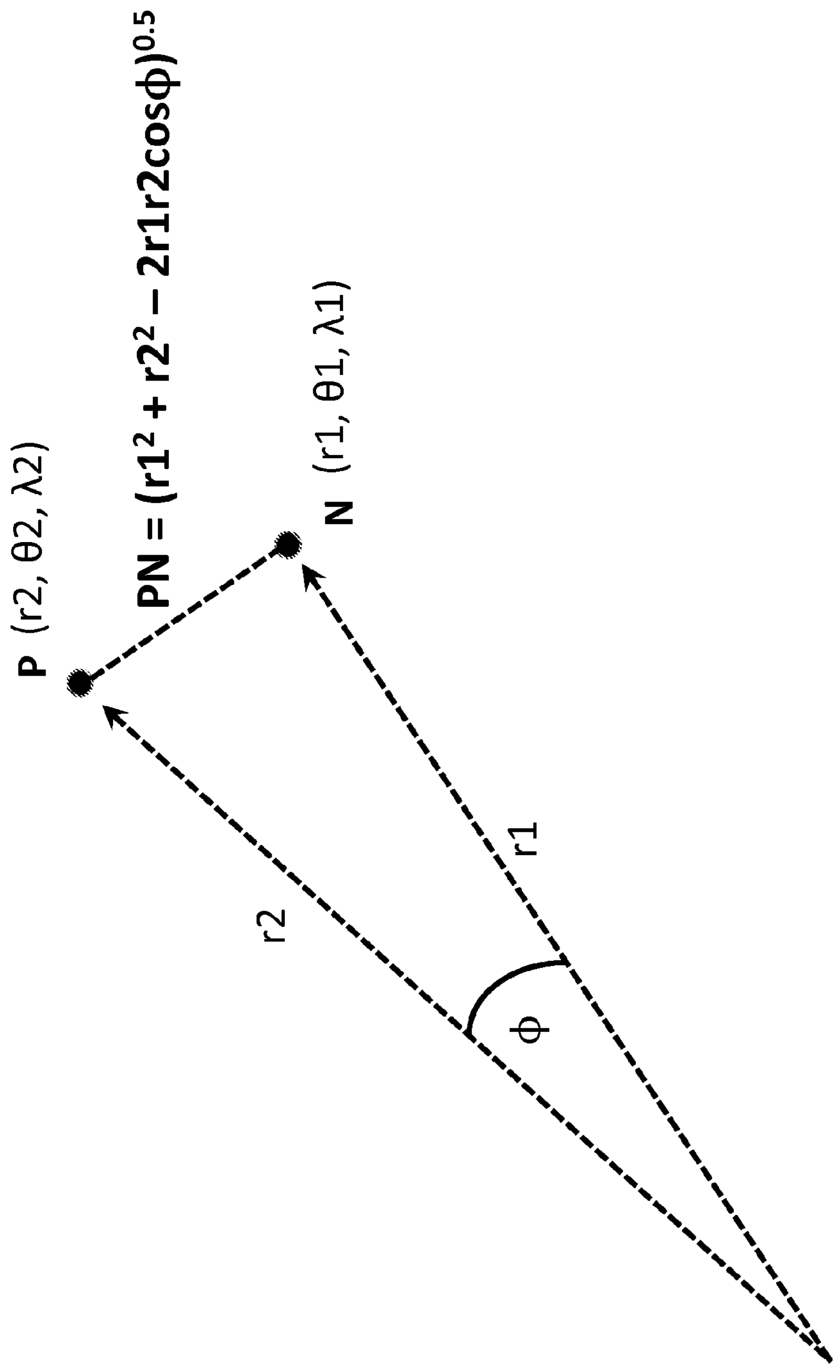

FIGS. 6*a* through 6*d* demonstrate an embodiment in more detail. FIG. 6*a* shows a front view of a depth camera 601 taking an image of a person from a side angle. FIG. 6*b* shows the situation of FIG. 6*a* but from a top view. FIG. 6*c* shows that different pixel locations on the image sensor of the depth camera can be translated to specific inclination and azimuth angles in a spherical coordinate system. FIG. 6*d* shows a calculation of the distance between two points in 3D space specified in spherical coordinates.

As is understood in the art, spherical coordinates identify a point in 3D space ($r,\theta,\lambda$) with a radial distance r from an origin to the point, an inclination angle $\theta$ of the radius and an azimuth angle $\lambda$ of the radius. 6*a* shows the front view perspective of a person's image being taken by a depth camera that is at an angle relative to the person rather than directly facing the person.

For convenience, components of the position of the person's right wrist P and right elbow N as specified in 3D space in spherical coordinates is also depicted. As observed in FIG. 6*a*, the right wrist P is a radial distance r1 from the camera and the right elbow N is a radial distance r2 from the camera. Additionally, the right wrist P is raised higher than the right elbow N. As such, the inclination angle $\theta 1$ for the spherical coordinate that identifies point P is greater than the inclination angle $\theta 2$ for the spherical coordinate that identifies point N (where the inclination angle is measured from the x-y plane).

FIG. 6*b* shows the top down view of the situation of FIG. 6*a*. Here, as the person's right wrist P is farther to the left of the camera than the person's right elbow N, the azimuth angle $\lambda 1$ for point P is more negative than the azimuth angle $\lambda 2$ for point N. Additionally, because the camera is to the person's right and the person's wrist P is farther to the person's right than the person's elbow N, the radial distance r1 from the camera to the person's right wrist P is shorter than the radial distance r2 from the camera to the person's right elbow N. Thus, FIGS. 6*a* and 6*b* show that the position of the person's right wrist P is specified with spherical coordinates ($r1$, $\theta 1$, $\lambda 1$) while the position of the person's right elbow N is specified with spherical coordinates ($r2$, $\theta 2$, $\lambda 2$).

FIG. 6*c* provides a depiction of the depth camera's image sensor and indicates that each pixel may have an associated inclination angle and azimuth angle. For ease of comprehension, the inclination angle $\theta$ is deemed to be measured from the x-y plane. As such, pixels that reside increasingly above the origin having increasingly larger, positive inclination angle $\theta$ and pixels that reside increasingly beneath the origin having increasingly larger, negative inclination angle $\theta$. Likewise, pixels that reside increasingly to the right of the origin having increasingly larger, positive azimuth angle $\lambda$ and pixels that reside increasingly to the left of the origin having increasingly larger, negative azimuth angle $\lambda$.

Thus, for instance, the pixel in the upmost left hand corner of the pixel array will have the largest positive inclination angle $\theta$ and largest negative azimuth angle $\lambda$. The magnitude of these angles will decline moving from the upper left hand corner to the origin (their respective polarities remain, however). Likewise, the pixel in the lowest right hand corner of the pixel array will have the largest negative inclination angle $\theta$ and largest positive azimuth angle $\lambda$. The magnitude of these angles decline moving from the lower right hand corner to the origin (their respective polarities remain, however).

Thus, each and every pixel in the image sensor has an associated unique combination of inclination and azimuth angle that articulates the angular spherical coordinate values for the portion of the camera's field of view that the pixel senses an image of. The unique inclination and azimuth angles for each pixel are, e.g., a function of the imaging optics of the camera. For example, as the imaging optics of the camera "zoom out", which correspondingly gives the camera a larger field of view, the magnitude of the inclination and azimuth angles for the pixels will increase (wider angles are needed to capture a larger field of view). Contrawise, as the imaging optics of the camera "zoom in", which correspondingly gives the camera a smaller field of view, the magnitude of the inclination and azimuth angles for the pixels will decrease (narrower angles are sufficient to capture a smaller field of view). Any specific mapping between (x,y) pixel coordinates and azimuth/inclination angles are predetermined optical attributes of the underlying camera device. Those of ordinary skill will be able to readily calculate the appropriate mapping for their particular device.

To continue the example presently being described, note that FIG. 6*c* also includes points P and N as they would approximately appear to the image sensor of the camera in the situation of FIGS. 6*a* and 6*b*. Here, from the discussions provided just above, it is clear that the pixel in which point P appears will have larger positive inclination angle $\theta 1$ and larger negative azimuth angle $\lambda 1$ than the inclination and azimuth angles $\theta 2$, $\lambda 2$ of the pixel in which point N appears. This reaffirms the actual depictions of these angles as drawn in FIGS. 6*a* and 6*b*.

Given that each pixel has its own unique inclination angle $\theta$ and azimuth angle $\lambda$, all that is needed is a radial distance value for each pixel to essentially form a spherical coordinate in 3D space for each pixel of the image sensor. Here, in the case of a depth camera, the radial distance value corresponds to the depth measurement that is made by the camera at each pixel. That is, given that each pixel measures a distance between itself and an object in the camera's field of view, the specific distance detected by each pixel corresponds to the radial distance r of the spherical coordinate in 3D space in front of the camera to the portion of the object that the pixel reacts to.

Thus, combination of the unique inclination and azimuth angles for each pixel together with each pixel's distance measurement will construct an array of dimension equal to the array of the image sensor that describes the surface of the object in front of the camera in spherical coordinates. FIG. 6*d* shows the actual spherical coordinates for points P and N when this approach is taken. The distance between the two points P and N is readily calculable from well established geometry as observed in FIG. 6D. Here, $\phi$ corresponds to the angular difference between rays r1 and r2 in 3D space (which can have both an inclination component and azimuth component). The difference angle $\phi$ between any two points specified in spherical coordinates (such as P and N) is also readily calculable from known geometry. Importantly, again, the distance between the two points is explicitly determinable even though the camera is not directly facing the subject in front of the camera.

Thus, referring back to FIG. 5, once the surface of the object in front of the camera has been articulated in spherical coordinates 501, the spherical coordinate values are analyzed against the general shape and form of a human body to pinpoint where the specific looked for body parts are and assign specific pixels to them. Once the body parts have been assigned a pixel coordinate, distance between body parts is readily calculable from the geometry of FIG. 6*d* and the inclination, azimuth and depth values of the pixels. The person's body may need to be in a specific position (e.g., standing upright with arms and legs extended and bent) or may be in various positions (e.g., sitting, walking, running, etc.) depending on the sophistication of the technology used to detect the person's body part.

FIG. 7 pertains to a basic embodiment that uses the body part distance vector profiling approach described herein to identify the person. In the example of FIG. 7, a depth camera 701 captures a depth image of a person as described above. A first computing system 702 that is indirectly or directly coupled to the camera (e.g., the CPU and/or image signal processor of a smartphone in which the depth camera is integrated) analyzes the image to define the body parts and then calculates distances between body parts to form a profile vector for the person.

The vector is then sent over a network 703 to a second computing system 704 having, e.g., an associated data store that includes a database of profile vectors for a plurality of people. The second computing system 704 compares the received profile against the database's contents which links each of its different profiles to a specific, different person. When a match is found between the input profile and a profile in the database, the person is identified.

With the person being identified, a wide range of different follow on processes can then be executed (e.g., automatically opening a door for a person, automatically providing network access to a person, directing ads specially targeted for the person to the person (via the person's smartphone or other media such as television (interactive or otherwise)), automatically moving an electro-mechanical device (e.g., a mirror) to adjust to the person's specific dimensions, automatically setting input values to a piece of electronic equipment (e.g., setting a thermostat to a specific temperature, setting a specific TV channel), etc. The identification of the person may be explicit (an actual name of the person is articulated) or implicit (a mirror is moved to an angle specially crafted for the person's dimensions but no name of the person is ever articulated).

The identification of the person may involve a probabilistic approach in which, from a number of candidate vectors in the database that "might" be the person in front of the camera, one is chosen as being the most-likely vector for the person in front of the camera. Note that the person's full body may not be entirely observable from the camera (some parts of the body may be hidden). Nevertheless, if enough vector elements are able to be determined, a match to the correct vector in the database may still be possible. Various approaches may be used to identify the most likely matching vector in the database such as Hidden-Markov-Chain approach or a Support Vector Machine approach.

It is pertinent to point out that in an alternate approach the image data (or a compressed version of it) may be directed over the network 703 to the second computer 704 and the second computer 704 (rather than the first computer 702) performs the body part identification process as well as the vector comparison against the database. Alternatively still, the first computer system 702 may also be fitted with sufficient CPU resources and/or access to the database (e.g., internally) and may therefore be able to perform either or both of body part recognition and profile vector matching.

The network 703 may be a wide area network (e.g., the Internet) or may be a local area network or even a local point-to-point link (e.g., Bluetooth). In the case of a local network or link, for example, the camera may be integrated into the dashboard of a car that is coupled via a link to a computer which identifies a driver's body parts and automatically moves the mirrors and/or the seat to fit the person's specific dimensions.

It is pertinent to point out that facial recognition may also be combined with other body part distance measurement techniques to confirm a person's identity. The facial recognition aspect may be implemented with body part distance calculations (e.g., distance between eyes, distance between a specific eye and chin, distance between a specific eye and nose, etc.). Other applications may choose not to include any aspect of facial recognition as part of the person identification process.

FIG. 8 shows a depiction of an exemplary computing system 800 such as a personal computing system (e.g., desktop or laptop) or a mobile or handheld computing system such as a tablet device or smartphone that, e.g., could conceivably be used as the first computing system 702 discussed above in FIG. 7. The computing system model of FIG. 8 also largely describes components of larger computing systems (e.g., servers) that may be used to implement the second computing system 704 of FIG. 7.

As observed in FIG. 8, the basic computing system may include a central processing unit 801 (which may include, e.g., a plurality of general purpose processing cores 815_1 through 815_N and a main memory controller 817 disposed on an applications processor), system memory 802, a display 803 (e.g., touchscreen, flat-panel), a local wired point-to-point link (e.g., USB) interface 804, various network I/O functions 805 (such as an Ethernet interface and/or cellular modem subsystem), a wireless local area network (e.g., WiFi) interface 806, a wireless point-to-point link (e.g., Bluetooth) interface 807 and a Global Positioning System interface 808, various sensors 809_1 through 809_N, one or more cameras 810, a battery 811, a power management control unit 812, a speaker and microphone 813 and an audio coder/decoder 814.

An applications processor or multi-core processor 850 may include one or more general purpose processing cores 815 within its CPU 801, one or more graphical processing units 816, a memory management function 817 (e.g., a memory controller), an I/O control function 818 and one or more image signal processor pipelines 819. The general purpose processing cores 815 typically execute the operating system and application software of the computing system. The graphics processing units 816 typically execute graphics intensive functions to, e.g., generate graphics information that is presented on the display 803. The memory control function 817 interfaces with the system memory 802 to write/read data to/from system memory 802. The image signal processing pipelines 819 receive image information from the camera 810 and process the raw image information for downstream uses. The power management control unit 812 generally controls the power consumption of the system 800.

Each of the touchscreen display 803, the communication interfaces 804-807, the GPS interface 808, the sensors 809, the camera 810, and the speaker/microphone codec 813, 814 all can be viewed as various forms of I/O (input and/or output) relative to the overall computing system including, where appropriate, an integrated peripheral device as well (e.g., the one or more cameras 810). Depending on implementation, various ones of these I/O components may be integrated on the applications processor/multi-core processor 850 or may be located off the die or outside the package of the applications processor/multi-core processor 850.

In an embodiment one or more cameras 810 includes a depth camera capable of measuring depth between the camera and an object in its field of view. Application software, operating system software, device driver software and/or firmware executing on a general purpose CPU core (or other functional block having an instruction execution pipeline to execute program code) of an applications processor or other processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:

capturing a pixelated depth image of a person with a depth camera, said capturing comprising converting light into electronic information that corresponds to said pixelated depth image of said person;

identifying, with a processor, body parts from the image, the identified body parts selected from the group consisting of:

a hand;

a foot an elbow;

a knee;

an ankle;

a shoulder;

a wrist;

a waist;

a hip;

an arm;

a leg;

forming a vector of distances between the body parts, wherein, a same one of the body parts is not used to determine all of the distances; and, comparing the vector against a database of respective body distance vectors for a plurality of people to identify who the person is.

2. The method of claim 1 wherein the depth camera is not directly in front of the person.

3. The method of claim 1 wherein the depth camera is off to the side of the person.

4. The method of claim 1 wherein the depth camera is behind the person.

5. The method of claim 1 wherein the person is partially hidden from the view of the camera.

6. The method of claim 1 wherein the capturing of a pixelated depth image includes, for each of a plurality of pixels:

measuring a distance from a pixel to the person; and, associating an inclination and azimuth angle for the pixel to form a spherical coordinate for a point on the person's body for the pixel.

7. The method of claim 1 further comprising calculating distances between the body parts in three dimensional space.

8. A non transitory machine readable medium containing stored program code that when processed by a computing system causes a method to be performed, the method comprising:

capturing a pixelated depth image of a person with a depth camera of the computing system, said capturing comprising passing light through said depth camera, said light impinging upon an image sensor having pixels that are sensitive to said light, said pixels converting said light into electronic information that corresponds to said pixelated depth image of said person;

identifying, with a processor of the computing system, body parts from the image, the identified body parts selected from the group consisting of:

a hand;

a foot an elbow;

a knee;

an ankle;

a shoulder;

a wrist;

a waist;

a hip;

an arm;

a leg;

calculating distances between the body parts in three dimensional space, wherein, a same one of the body parts is not used to determine all of the distances; and, forming a vector of the distances to create a profile for identifying who the person is.

9. The machine readable medium of claim 8 wherein the depth camera is not directly in front of the person.

10. The machine readable medium of claim 8 wherein the depth camera is off to the side of the person.

11. The machine readable medium of claim 8 wherein the depth camera is behind the person.

12. The machine readable medium of claim 8 wherein the person is partially hidden from the view of the camera.

13. The machine readable medium of claim 8 wherein the capturing of a pixelated depth image includes, for each of a plurality of pixels:

measuring a distance from a pixel to the person; and, associating an inclination and azimuth angle for the pixel to form a spherical coordinate for a point on the person's body for the pixel.

14. The machine readable medium of claim 8 wherein the method further comprises sending the vector over a network to a computing system that determines the identity of the person.

15. The machine readable medium of claim 8 wherein the method includes performing any of the following in response to the vector being used to identify the person:

presenting a targeted ad for the person;

adjusting an item of electronic equipment for the person;

manipulating an electro-mechanical device for the person;

granting access to a secured resource for the person.

16. An apparatus, comprising:

one or more processors coupled to a system memory through a memory controller;

a depth camera;

storage device resources containing program code that when processed by the one or more processors causes a method to be performed, the method comprising:

capturing a pixelated depth image of a person with said depth camera, said capturing comprising converting light into electronic information that corresponds to said pixelated depth image of said person;

with the one or more processors, identifying body parts from the image, the identified body parts selected from the group consisting of:

a hand;

a foot an elbow;

a knee;

an ankle;

a shoulder;

a wrist;

a waist;

a hip;

an arm;

a leg;

calculating distances between the body parts in three dimensional space, wherein, a same one of the body parts is not used to determine all of the distances; and, forming a vector of the distances to create a profile for identifying who the person is.

17. The apparatus of claim 16 wherein the depth camera is not directly in front of the person.

18. The apparatus of claim 16 wherein the depth camera is off to the side of the person.

19. The apparatus of claim 16 wherein the depth camera is behind the person.

20. The apparatus of claim 16 wherein the person is partially hidden from the view of the camera.

21. The apparatus of claim 16 wherein the capturing of a pixelated depth image includes, for each of a plurality of pixels:

measuring a distance from a pixel to the person; and, associating an inclination and azimuth angle for the pixel to form a spherical coordinate for a point on the person's body for the pixel.

22. The apparatus of claim 16 wherein the method further comprises sending the vector over a network to a computing system that determines the identity of the person.

23. The apparatus of claim 16 wherein the method further comprises performing any of the following in response to the vector being used to identify the person:

presenting a targeted ad for the person;

adjusting an item of electronic equipment for the person;

manipulating an electro-mechanical device for the person;

granting access to a secured resource for the person.

* * * * *